United States Patent [19]
McNamara et al.

[11] 3,861,759
[45] Jan. 21, 1975

[54] ADAPTIVE BRAKING SYSTEM

[75] Inventors: Mary T. McNamara; Dennis J. Davis; John W. Oglesbee; Gale F. Krawczak; Donald J. McKinnon, all of Elyria, Ohio

[73] Assignee: The Bendix Corporation, South Bend, Ind.

[22] Filed: Sept. 26, 1973

[21] Appl. No.: 401,082

[52] U.S. Cl. .............................. 303/21 P, 303/20
[51] Int. Cl. .............................................. B60t 8/10
[58] Field of Search ....... 188/181; 244/111; 303/20, 303/21; 307/10 R; 317/5; 324/161–162; 340/53, 262, 263

[56] References Cited
UNITED STATES PATENTS

| | | | |
|---|---|---|---|
| 2,944,773 | 7/1960 | Highley | 244/111 |
| 3,578,819 | 5/1971 | Atkins | 303/21 BE |
| 3,640,588 | 2/1972 | Carp et al. | 303/21 BE X |
| 3,790,227 | 2/1974 | Dozier | 303/21 P X |
| 3,791,701 | 2/1974 | Riordan | 303/20 X |

Primary Examiner—Trygve M. Blix
Assistant Examiner—Stephen G. Kunin
Attorney, Agent, or Firm—Ken C. Decker; William N. Antonis

[57] ABSTRACT

An adaptive braking system is disclosed which simultaneously controls both wheels of a vehicle axle by a single control channel and modulating unit. The system normally operates in its primary mode, in which acceleration and deceleration information of the faster rotating wheel is used to control the modulator when an incipient skidding condition of either of the vehicle's wheels occurs. The system further includes a secondary mode of operation, which occurs when both of the wheels are rotating below some predetermined velocity reference level. Similarly, the system may also operate in the unbalanced mode when one of the wheels is rotating faster than its reference level and the other wheel is rotating below its reference level. Appropriate changes in the control of the modulator are made depending upon whether the system is operating in the primary, secondary, or unbalanced mode. One of the wheel speed signals is also used to generate a signal which is approximately proportional to the vehicle velocity. When this vehicle velocity signal is below some predetermined value, indicating that the vehicle is about to stop, adaptive control of the vehicle's brakes is terminated.

11 Claims, 3 Drawing Figures

PATENTED JAN 21 1975 3,861,759

ADAPTIVE BRAKING SYSTEM

BACKGROUND OF THE INVENTION

This invention relates to an adaptive braking system for a ground vehicle.

Many adaptive braking systems for vehicles having fluid pressure operated brakes have been proposed. However, to date, none of these systems have been accepted for widespread commercial use. In order to be commercially acceptable, the adaptive braking system must provide a proper control of the vehicle's brakes on both high and low coefficient surfaces, and must also provide effective control of the vehicle's brakes when one wheel of an axle is on a high coefficient surface and the other wheel is on a low coefficient surface. The present system provides separate modes of operation for each of the three possible conditions described hereinabove. Furthermore, provision is made to terminate adaptive control of the vehicle's brakes when the vehicle has decelerated to such an extent that it is about to stop. This is accomplished by using wheel speed information to generate a signal which is substantially proportional to vehicle velocity. This signal may be used to terminate adaptive control of the vehicle's brakes when the vehicle has slowed to such an extent that adaptive control is no longer desirable.

SUMMARY OF THE INVENTION

Therefore, an important object of our invention is to use a single modulator and electronic control channel for adaptive control of the brakes controlling each wheel on a vehicle axle.

Another important object of our invention is to provide proper adaptive control of the vehicle's brakes when the vehicle is operating on high coefficient surfaces, low coefficient surfaces, and when one of the wheels of the vehicle's axle is operating on a high coefficient surface and the other wheel is operating on a low coefficient surface.

Another important object of our invention is to provide circuitry in an adaptive braking system which is capable of generating a function which is substantially proportional to the vehicle velocity, and to use this signal to terminate adaptive control of the vehicle's brakes when the vehicle has slowed to such an extent that it is about to stop.

DETAILED DESCRIPTION

Figure 1:
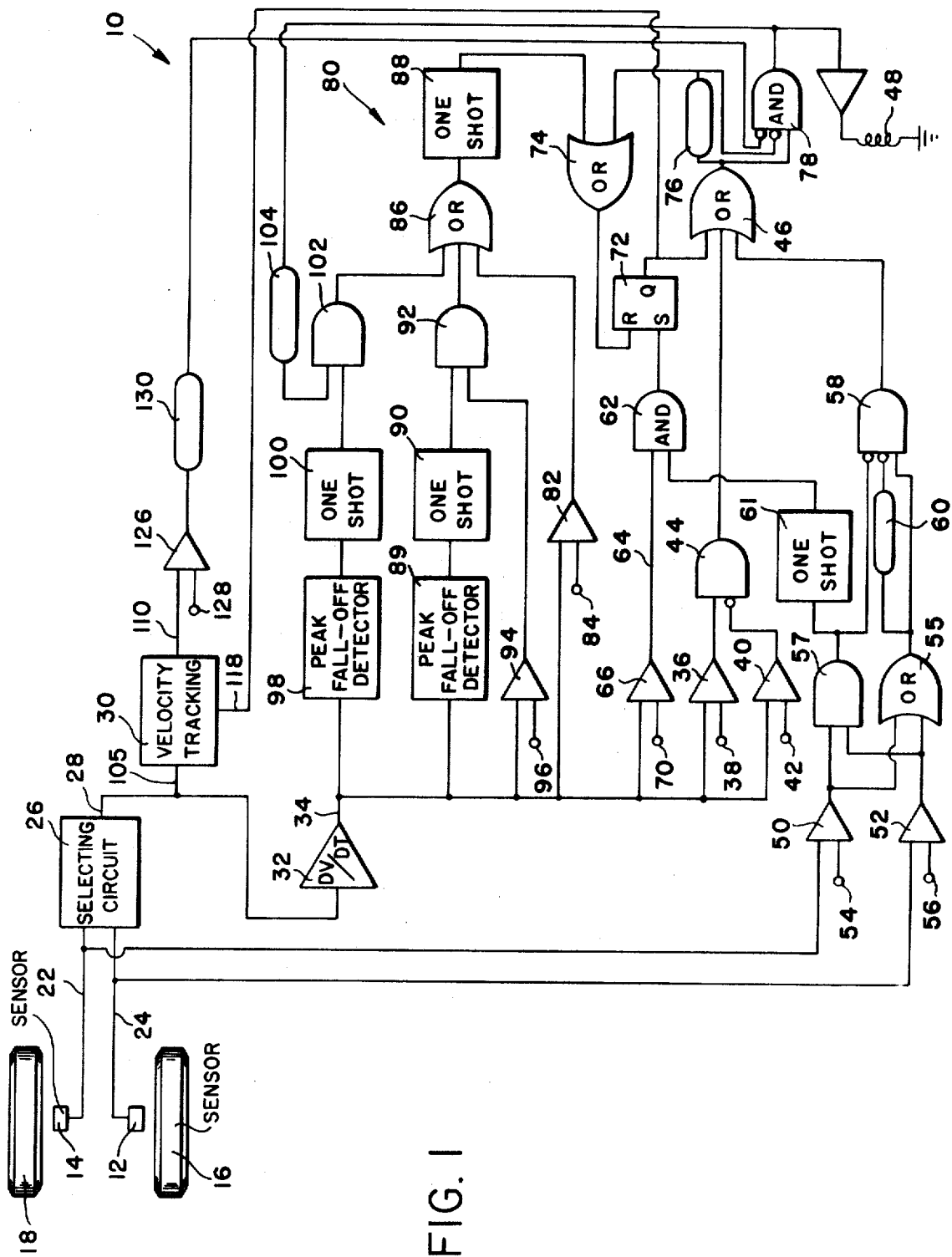
FIG. 1 is a functional block diagram of the adaptive braking system made pursuant to the teachings of our present invention.

Referring now to FIG. 1 of the drawings, an adaptive braking system generally indicated by the numeral 10 includes wheel speed sensors 12, 14 which are adapted to generate a signal proportional to the rotational velocity of their corresponding wheels 16 and 18, respectively, the wheels 16 and 18 being mounted on opposite ends of a common axle. The wheel speed sensors 12 and 14 are of a type well known to those skilled in the adaptive braking art, and will not be described in detail. The signal generated by the wheel speed sensors 12 and 14 are fed into the input terminals 22 and 24 of selecting circuitry generally indicated by the numeral 26. Selecting circuitry 26 selects the signals representing the faster rotating wheel and generates the signal representing the speed of this wheel on terminal 28. The selecting circuitry 26 is a conventional circuit which is well known to those skilled in the adaptive braking art. For example, the selecting circuitry 26 may be made pursuant to the teachings of U.S. Pat. No. 3,535,004, owned by the assignee of the present invention and incorporated herein by reference. Terminal 28 of the selecting circuitry 26 is connected to the input terminal of the velocity tracking circuit 30, which will be described in detail hereinafter, and also to the input terminal of a differentiator 32, which differentiates its input signal to generate a signal at its output terminal 34 which is proportional to acceleration and deceleration of the corresponding faster rotating wheel 16 or 18. One terminal of a comparator 36 is connected to the output terminal 34, and the other terminal of the comparator 36 is connected to a predetermined reference level 38, which represents a predetermined value of the deceleration signal. Similarly, the terminal 34 is also connected to an input terminal of another comparator 40, the other terminal of which is connected to a reference level 42 which is equal to another predetermined value of the deceleration signal. Both the reference levels 38 and 42 represent deceleration levels, but the reference level 38 is at a higher deceleration reference level than is the level 42. One terminal of an AND gate 44 is connected to the output terminal of the comparator 36, and the other terminal of AND gate 44 is connected to the inverted output of the terminal of the comparator 40. Therefore, AND gate 44 will produce an output signal when the value of the deceleration signal transmitted to the output of the terminal 34 drops below reference level 38, and the output signal from the AND gate 44 will terminate when the corresponding wheel reaccelerates so that the value of the signal generated by the differentiator 32 increases above the reference level 42. The output signal of the AND gate 44 is defined as the primary mode signal, and is transmitted to one input of an OR gate 46, the output of which is used to actuate a solenoid valve 48 to effect a brake pressure decay, as will be further described hereinafter. The solenoid 48 is a portion of an adaptive braking modulator of a type well known to those skilled in the art, such as the type disclosed in U.S. Pat. Application Ser. No. 199,109, filed Nov. 16, 1971, now abandoned, owned by the assignee of the present invention and incorporated herein by reference.

The adaptive braking system 10 normally operates in the primary mode as described hereinabove, and this logic provides adequate control on most surfaces over which the vehicle traverses. However, on some surfaces, one wheel or both wheels may quickly lock while the vehicle is still traveling at an appreciable velocity. This most often occurs when the vehicle is operated on an icy surface or when one wheel is operating on an icy surface and the other wheel is operating on a surface having a much higher friction coefficient. The unbalanced mode of operation is declared when one of the wheels 16 or 18 is rotating at a much lower speed than is the other wheel. One terminal of a comparator 50 is connected to the input terminal 22 of selecting circuitry 26. The input terminal of another comparator 52 is connected to the input terminal 24 of the selecting circuitry 26. The other input terminals of the comparators 50 and 52 are connected to reference levels 54 and 56 respectively. In the present system, the reference levels 54 and 56 represent relatively low wheel speeds, and the reference level 54 is the same as the reference level 56. The output terminals of the comparators 50 and 52 are connected to corresponding input terminals of an OR gate 55 and an AND gate 57. One input of another AND gate 58 is connected to the output of the OR gate 55, another input of the AND gate 58 is connected to the inverted output of the AND gate 57, and a third input of the AND gate 58 is connected to the inverted output of a timer 60. The input of the timer 60 is connected to the output of the OR gate 55. The timer 60 is responsive to the leading edge of the signal generated by the OR gate 55, and generates an output signal after a predetermined time period has elapsed after the OR gate 55 has generated the output signal. Therefore, AND gate 58 generates an output signal only when one, but not both, of the wheels 16 or 18 are rotating below its corresponding reference level, and the timer 60 has not timed out. The output signal of the AND gate 58 is defined as the unbalanced mode signal and is transmitted to one of the inputs of OR gate 46, the output of which actuates the solenoid valve 48 as described hereinabove. Therefore, the unbalanced mode signal is generated when either one, but not both, of the speeds of wheels 16 or 18 drop below their corresponding reference levels 54 and 56, and is terminated when both wheels are rotating below their reference levels, when the timer 60 times out, or when both of the wheels 16 and 18 recover so that neither wheel is rotating below its corresponding reference level 54 or 56. As noted hereinabove, the timer 60 is actuated by the leading edge of the signal generated by the OR gate 55, and therefore, the timer period will only be restarted when both wheels recover to rotate above their reference level, and then one of the wheels drops back to rotate below its reference level while the other wheel is still rotating above its reference level. Thus, if the speeds of both wheels drop to a value less than that represented by their corresponding reference levels, the unbalanced mode signal will be extinguished, but the timer 60 will not be reset, so that if the faster rotating wheel drops below its reference level and it then recovers so that it is again rotating faster than the value represented by its reference level, the unbalanced mode signal will only be generated for the remaining time period allowed by the timer 60.

When both of the wheels 16 and 18 are rotating at such a low speed that locking is imminent, the braking pressure must immediately be decayed, and the brake pressure decay must continue until the wheels are again rotating at a speed substantially synchronous with vehicle speed, since the wheels may immediately lock before the adaptive braking system is able to react. For this reason, the secondary mode has been provided to control braking when both wheels are rotating at a low wheel speed. The secondary mode terminates when the wheels are again rotating substantially synchronous with vehicle speed. As described hereinabove, AND gate 57 produces an output signal only when both of the wheels are rotating at a very low speed, i.e., below the speeds represented by the reference levels 54 and 56. The output signal of the AND gate 57 fires a one shot 61, the output of which is connected to one of the input terminals of another AND gate 62. The other input of the AND gate 62 is connected to the output of comparator 66. One of the inputs to the comparator 66 is connected to the output terminal 34 of the differentiator 32, which is the signal representing acceleration and deceleration of the faster rotating wheel. The other input terminal of the comparator 66 is connected to a reference level 70 representing a predetermined low deceleration level less than deceleration level 38. Therefore, the comparator 66 will generate an output signal only when the value of the signal generated on the output terminal 34 is less than reference level 70. Therefore, AND gate 62 will generate an output signal only when the deceleration of the faster rotating wheel is below the reference level 70, and both wheels are rotating at less than their corresponding reference levels 54 and 56. The output signal from AND gate 62 sets a flip flop 72, the output of which is transmitted to yet another input of the OR gate 46 and is defined as the secondary mode signal. The reset terminal of the flip flop 72 is connected to the output of an OR gate 74. One of the inputs to OR gate 74 is connected to the output of a timer 76, which is actuated by the leading edge of the output signal generated by the OR gate 46. The timer 76 generates a signal when a predetermined time period has elapsed after the leading edge of the signal generated by the OR gate 46 is received by timer 76. Therefore, the duration of the secondary mode signal generated by the flip flop 72 is limited to the time period of the timer 76. The output of the timer 76 is also inverted and transmitted to one of the inputs of AND gate 78, one of the other of the inputs of which is connected directly to the output of OR gate 46. The output of AND gate 78 is connected directly to the solenoid 48. Therefore, the solenoid 48 can be on only for a time period less than that established by the timer 76.

The other input of the OR gate 74 is connected to secondary mode reset circuitry generally indicated by the numeral 80. The purpose of the circuitry 80 is to determine when the faster rotating wheel is rotating at a speed substantially synchronous with vehicle speed. When this occurs, of course, it is desirable to terminate the brake pressure decay and allow brake pressure to rebuild, since the wheels are no longer in danger of locking. Circuitry 80 includes a comparator 82 having one input terminal connected to the output terminal 34 of the differentiator 32, and having its other terminal connected to a reference level 84, which corresponds to a relatively high value of the acceleration signal generated by the differentiator 32. When the acceleration signal generated by the differentiator 32 exceeds the reference level 84, comparator 82 generates an output signal which is transmitted to one of the inputs of an OR gate 86, which thereupon generates an output signal firing a one shot 88. The pulse generated by the one shot 88 is fed through the OR gate 74 to the reset terminal of the flip flop 72, thereby cancelling the secondary mode signal and terminating the brake pressure decay. Circuitry 80 further includes a peak fall-off detector 89 having an input terminal connected to the terminal 34 of the differentiator 32 and an output terminal connected to the input of a one shot 90. The pulse generated by the one shot 90 when the latter is fired is transmitted to one of the inputs of an AND gate 92, the output of which is connected to another of the input terminals of OR gate 86. The peak fall-off detector 89 is well known to those skilled in the art, and includes circuitry for detecting the maximum value of the acceleration signal generated by the differentiator 32. When the value of the acceleration signal decreases a predetermined amount from the peak value, the peak fall-off detector 89 generates an output signal firing the one shot 100. The other input of the AND gate 92 is connected to the output of a comparator 94, having one input connected to the terminal 34 of differentiator 32 and the other input connected to a reference level 96, which represents substantially a zero value of the acceleration signal. Therefore, if the value of the acceleration signal generated by the differentiator 32 is greater than zero, i.e., the wheel speed is increasing, comparator 94 generates an output signal which is fed to the AND gate 92. Therefore, AND gate 92 will only produce an output signal when the value of the acceleration signal has decreased a predetermined amount from its peak value, and the value of the acceleration signal after this decrease from peak value is still greater than zero. The output signal from the AND gate 92 is fed through OR gate 86 to fire one shot 88, and therefore resets the flip flop 72.

Circuitry 80 further includes yet another peak fall-off detector 98, having an input terminal connected to the output terminal 34 of the differentiator 32 and an output terminal connected to the input of a one shot 100. Peak fall-off detector 98 is similar to the peak fall-off detector 89, and responds to a predetermined fall-off from the maximum value of the acceleration signal generated by the differentiator 32 to generate an output signal firing a one shot 100. However, the fall-off allowed by the peak detector 98 before actuating one shot 100 is much less than the fall-off allowed by the peak detector 89 for firing the one shot 90. The output of the one shot 100 is transmitted to one input of AND gate 102. The other input of AND gate 102 is connected to the output terminal of a timer 104, the input of which is connected to the output of the AND gate 78. When AND gate 78 generates an output signal actuating the solenoid 48, the timer 104 is started, and a predetermined time period after the timer is started, the timer produces an output signal which is transmitted to the input terminal of the AND gate 102. Therefore, the AND gate 102 produces an output signal only when the fall-off allowed by the peak fall-off detector 98 occurs after the solenoid valve 48 has been on for a time period equal to that of the timer 104. The output of AND gate 102 is fed through the OR gate 86 to reset the flip flop 72 in the manner described hereinabove. Therefore, in summary, flip flop 72 is reset when the high speed wheel accelerates to a value exceeding the reference value on terminal 84 of comparator 82; when the value of the wheel acceleration decreases from its peak value in an amount equal to the fall-off allowed by the peak detector 89, provided that the current value of the acceleration signal is greater than zero acceleration; and when the value of the wheel acceleration has decreased from its peak value the amount allowed by the peak fall-off detector 98, after the exhaust solenoid 48 has been on for the time period of the timer 104.

Figure 2:
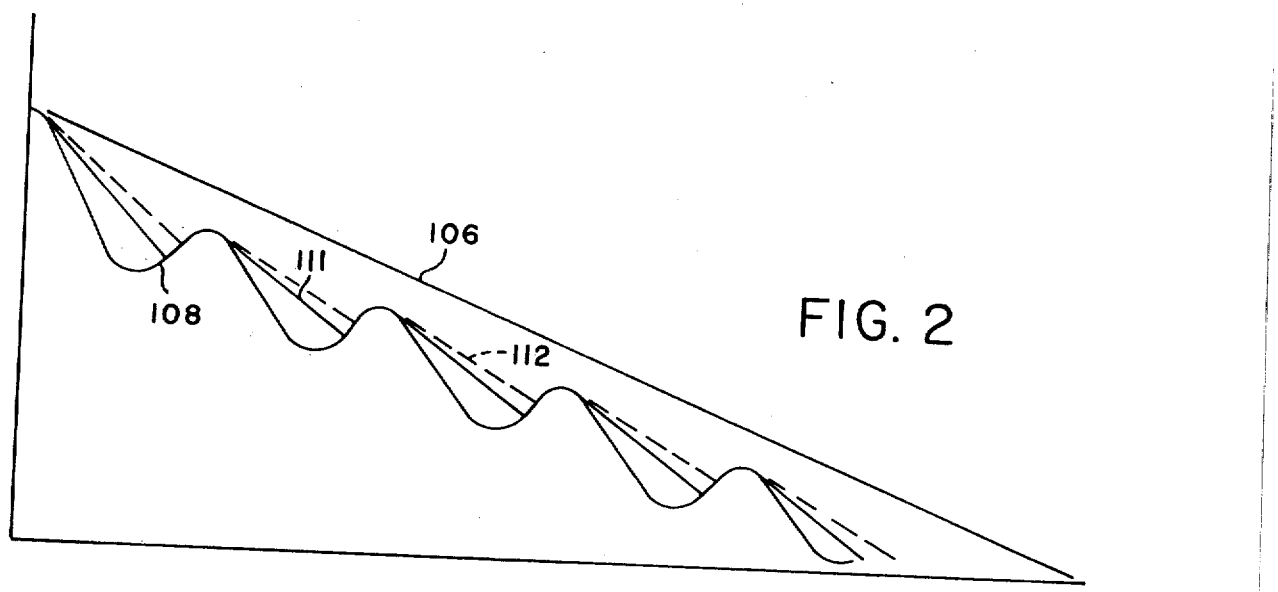
FIG. 2 is a graphical representation of vehicle velocity, wheel velocity, and signal generated as a function of the wheel velocity which approximates vehicle velocity during operation of adaptive braking system.

The velocity tracking circuitry 30 will now be described in detail. Referring now to FIG. 2, vehicle speed decreases along the line represented by line 106 in FIG. 2 during a stop controlled by the adaptive braking system 10. However, since the system 10 continually releases and reapplies the brakes of the vehicle during the stop, wheel speed varies along a line represented by the line 108 in FIG. 2. The velocity tracking circuitry 30 is responsive to the wheel speed represented by line 108 to generate a function represented by lines 111. As can be seen in FIG. 2, the lines 111 are generally parallel to line 106, and therefore, the output of the velocity tracking circuitry 30 is approximately proportional to the vehicle speed at any given time during operation of the adaptive braking system when the wheel speed is decreasing. The velocity tracking circuitry 30 includes means responsive to the secondary mode signal generated by the flip flop 72 to change the slope of the line 111 to the slope represented by the line 112 when the adaptive braking system 10 is operating in the secondary mode. This is necessary because the vehicle will decelerate much more slowly when the system is operating in the secondary mode, and the velocity tracking circuitry 30 must account for this difference in vehicle deceleration. Therefore, the output of the velocity tracking circuitry 30 is approximately proportional to the actual vehicle speed at all times.

Figure 3:
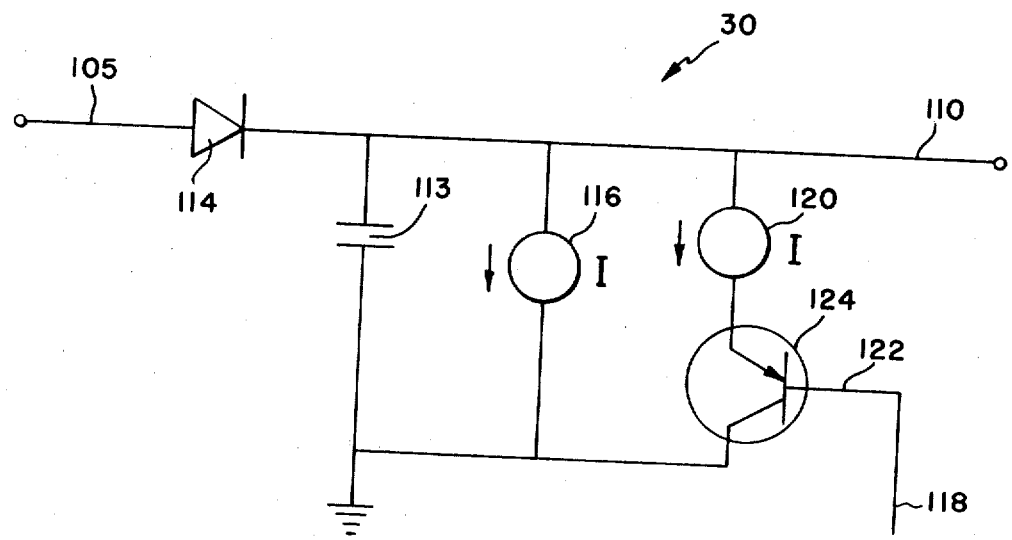
FIG. 3 is an electrical schematic of the velocity tracking circuit used in our adaptive braking system.

FIG. 3 illustrates the content of the velocity tracking circuitry 30. Circuitry 30 includes an input terminal 105 which is connected to the output terminal 28 of selecting circuitry 26. Therefore, the signal representing the rotational velocity of the faster rotating wheel charges a capacitor 113 which is connected between the terminal 106 and ground. As long as the rotational velocity of the wheel continues to increase, the charge on the capacitor 113 will continue to increase. However, when the rotational velocity of the wheel decreases, diode 114 prevents discharge of the capacitor 113 through the terminal 105. Therefore, when wheel speed is decreasing, the only discharge paths of the capacitor 113 are through the current sources 116 and 120 which are connected in parallel with the capacitor 113. As is well known to those skilled in the art, the current sources 116 and 120 limit the discharge of the capacitor 113 to some predetermined rate governed by the magnitude of the current sources 116 and 120. In the present case, the current sources 116 and 120 limit the discharge of the capacitor 113 to the rate represented by the line 111 in FIG. 2. When the wheel speed again increases above the value stored on the capacitor 113 at any given time, charging of the capacitor 113 resumes. Since the voltage on the output terminal 110 of circuitry 30 is the same as the voltage across the capacitor 113, the signal transmitted to comparator 126 by the tracking circuitry 30 will be substantially proportional to the vehicle velocity during periods when the wheel velocity is decreasing.

In order to accommodate operation of the system in the secondary mode, a switching transistor 124 is connected in series with current source 120. A base electrode 122 of the switching transistor 124 is connected to the input terminal 118 of the velocity tracking circuitry 30. Therefore, when an output signal is generated by the flip flop 72, transistor 124 will be turned off to switch the current source 120 out of the circuit, and thereby change the decay rate of the capacitor 113 to a value represented by the line 112 in FIG. 2. One input terminal of a comparator 126 is connected to the output terminal 110 of velocity tracking circuitry 30 and the other input terminal of the comparator 126 is connected to a reference velocity 128. The value represented by the reference velocity 128 corresponds to a relatively low value of vehicle speed, but this value is still substantially above the velocity levels represented by the reference levels 54, 56 of the comparators 50 and 52. When the value of the signal on the terminal 110 decreases to a value less than the reference velocity 128 comparator 126 generates an output signal which actuates a timer 130. The timer 130 generates an output signal a predetermined time period after it is actuated. If the wheel speed should reaccelerate above the level represented by the reference level 128 during this period, the timer 130 will be reset. Therefore, the timer 130 will produce an output signal only when the speed drops below the value represented by the reference 128 and remains below this reference level for the timer period. The inverted output of the timer 130 is transmitted to one of the inputs of the AND gate 78. As noted hereinabove, the other inputs of the AND gate 78 are connected to the output of the OR gate 46 and to the inverted output of the timer 76. The output of the AND gate 78 actuates the solenoid 48 which controls the brake pressure decay. Therefore, when the timer 130 times out to produce an output signal which is inverted by the input at the input terminal and AND gate 78, the output signal of the AND gate 78 will terminate, thereby terminating the brake pressure decay when the tracking velocity signal on output terminal 110 drops below the reference value 128 for the period of the timer 130.

MODE OF OPERATION

As described in detail hereinabove, a signal representing the rotational velocity of the faster rotating wheel is transmitted to the input of differentiator 32 and to the input of the corresponding comparator 50 or 52, and a signal representing the rotational velocity of the slower rotating wheel is transmitted to the input terminal of its corresponding comparator 50 or 52. Assuming that both of the wheels are rotating faster than the corresponding reference levels 54 and 56, operation of the adaptive braking system remains in the primary mode. The signal on the output terminal 34 of differentiator 32, which represents acceleration and deceleration of the faster rotating wheel, is transmitted to the comparators 36 and 40. When wheel deceleration drops below the reference level 38 the AND gate 44 produces an output signal which initiates a brake pressure decay as described hereinabove. The decay is terminated when the wheel deceleration increases to a value greater than that represented by the reference level 42, or when the output of the velocity tracking circuitry 30 remains below the reference level 128 of comparator 126 for a time period equal to that of the timer 130. Of course the signal representing the rotational velocity of the faster rotating wheel is fed into the velocity tracking circuitry and is used to derive the signal generated on the output terminal 110 of the tracking circuitry 30.

If the rotational velocity of the slower rotating wheel should drop below its corresponding reference level 54 or 56 while the rotational velocity of the faster rotating wheel remains above its reference level 54 or 56, OR gate 55 generates an output signal which is fed through AND gate 58 to actuate the solenoid 48. This is the unbalanced mode signal as described hereinabove. The unbalanced mode signal is extinguished when the output signal of AND gate 58 terminates, and therefore the brake pressure decay is terminated when the timer 60 times out; when the signal representing the velocity of the faster rotating wheel drops below its reference level 54 or 56, and therefore both of the wheels are rotating below their corresponding reference levels 54 and 56; and when the rotational velocities of both of the wheels increase above their reference levels 54 and 56. Of course, the adaptive braking brake pressure decay is also terminated when the timer 130 produces an output signal and when the period of the timer 76 expires, as also occurs during operation in the primary mode.

When both of the wheels are rotating at speeds below their corresponding reference levels 54 and 56, a signal is transmitted to one of the inputs of the AND gate 62. Thus, if while both of the vehicle's wheels are rotating at speeds less than their reference levels 54 and 56 the wheel deceleration of the faster rotating wheel drops below the reference level 70, AND gate 62 generates a signal setting flip flop 72. The output of flip flop 72, which is defined as the secondary mode signal, effects a brake pressure decay by actuating the solenoid 48 as described hereinabove. The secondary mode signal may be extinguished, as in the case of the primary and unbalanced modes, by the output signal from the timer 130 or expiration of the time period of the timer 76, but also may be extinguished by the reset of circuitry generally indicated by the numeral 80. As described hereinabove, the reset circuitry 80 terminates the secondary mode signal when the faster rotating wheel accelerates above the predetermined reference level 84 on the input terminal of comparator 82; when the signal representing acceleration of the faster rotating wheel has reached a peak value and decreased a predetermined amount from this peak value as allowed by the peak fall-off detector 89, assuming that the wheel acceleration is still greater than zero; or when the wheel acceleration decreases from its peak value by the lesser amount allowed by the peak fall-off detector 98 after the valve 48 has been actuated for a time period equal to the period of the timer 104.

We claim:

1. In a vehicle having an axle, a pair of wheels rotatable on said axle, and fluid pressure operated brake means controlling each of said wheels, an adaptive braking system to control actuation of said brake means comprising:
   means for generating a first speed signal proportional to the rotational velocity of one of said wheels and a second speed signal proportional to the rotational velocity of the other wheel;
   means for selecting one of said first and second speed signals;
   means for differentiating said selected speed signal for generating a first control signal proportional to acceleration and deceleration of the wheel corresponding to the selected speed signal;
   means for generating first, second, and third deceleration reference signals corresponding to first, second, and third values of said first control signal;
   means for generating a primary mode signal when the value of said first control signal drops below the value of said first deceleration reference signal and terminating the primary mode signal when the value of said first control signal increases to a value above the value of said second deceleration reference signal from a value less than the value of said second reference signal;

means for generating a first speed reference signal corresponding to a predetermined value of said first and second speed signals;

means for comparing each of said first and second speed signals with the first speed reference signal and generating a second control signal when the value of both of said first and second speed signals are below the value of said first speed reference signal;

means for comparing said first control signal with said third deceleration reference signal and generating a third control signal when the value of said first control signal is less than the value of said third deceleration reference signal;

means responsive to simultaneous generation of said second and third control signals for generating a secondary mode signal;

means responsive to either of said primary or said secondary mode signals for generating an actuation signal effecting a brake pressure reduction;

means responsive to said selected signal for generating a fourth control signal decaying at a predetermined rate when said selected signal decreases at a rate greater than said predetermined rate;

means for generating a second predetermined speed reference signal corresponding to a value of said fourth control signal; and means for comparing said fourth control signal to said second speed reference signal and generating a fifth control signal inhibiting said actuating signal when the value of said fourth control signal is less than the value of said second speed reference signal;

said predetermined rate at which said fourth control signal is decayed being a first rate when said primary mode signal is generated and a second rate when said secondary mode signal is generated.

2. The invention of claim 1:

said means for generating said fourth control signal including means for generating said signal decaying at said predetermined rate when said selected signal decreases at a more rapid rate than said predetermined rate but equating said fourth control signal with said selected signal when the latter increases, or decreases at a rate less than said predetermined rate, when the value of said first signal is greater than the value of the signal decreasing at said predetermined rate.

3. The invention of claim 2:

timing means responsive to initial generation of said fifth control signal for inhibiting said fifth control signal until said fifth control signal has been generated for a predetermined time period.

4. The invention of claim 1:

said means for generating said fourth control signal including energy storage means, the energy stored in said energy storage means increasing as the value of said selected signal increases, means presenting decrease of the energy stored by said energy storage means as the value of said selected signal decreases at a rate greater than the predetermined rate, and means for decreasing the energy stored by said energy storage means at said predetermined rate when the value of said selected signal decreases faster than said predetermined rate;

said means for decreasing the energy stored by said energy storage means being switchable from a first state permitting decrease of energy at a first predetermined rate during generation of said primary mode signal to a second predetermined rate during generation of said secondary mode signal.

5. The invention of claim 1; and means responsive to said first control signal for terminating said secondary mode signal.

6. The invention of claim 5:

said last-mentioned means including means for determining the peak value of said first control signal and generating a sixth control signal when the value of said first control signal decreases a predetermined amount from said peak value;

means responsive to said sixth control signal for cancelling said secondary mode signal; and timing means inhibiting said sixth signal for a predetermined time period after initial generation of said actuating signal.

7. In a vehicle having an axle, a pair of wheels rotatable on said axle, and fluid pressure operated brake means controlling each of said wheels, an adaptive braking system to control actuation of said brake means comprising:

means for generating a first speed signal proportional to the rotational velocity of one of the wheels;

means for generating a second speed signal proportional to the rotational velocity of the other wheel;

means for selecting one of said first and second speed signals;

means for differentiating said selected speed signal for generating a first control signal proportional to acceleration and deceleration of the wheel corresponding to the selected speed signal;

means for generating a deceleration reference signal corresponding to a predetermined value of said first control signal;

means for comparing said first control signal with the deceleration reference signal and generating a second control signal when the value of said first control signal drops below the value of said deceleration reference signal;

means for generating a speed reference signal corresponding to a predetermined value of said first and second speed signals;

means for comparing each of said first and second speed signals with the speed reference signal and generating a third control signal when the value of both of said first and second speed signals are below the value of said speed reference signal;

means for generating an actuating signal upon simultaneous generation of said second and third control signals;

means responsive to said actuating signal for effecting a brake pressure reduction in each of said brakes; and means responsive to said first control signal for terminating said actuating signal;

said last-mentioned means including means for determining the peak value of said first control signal and generating a fifth control signal when the value of said first control signal decreases a predetermined amount from said peak value;

timing means inhibiting said fifth signal for a predetermined time period after initial generation of said actuating signal.

8. The invention of claim 7:

said means for terminating said actuating signal further including second means for determining the peak value of said first control signal and generating a first intermediate signal when the value of said first control signal decreases a second predetermined amount from said peak value, means for comparing said first control signal with a reference signal representing zero acceleration and generating a second intermediate signal only when the value of the first control signal is greater than the last-mentioned reference signal, and means responsive to simultaneous generation of said first and second intermediate signals for cancelling said actuating signal.

9. In a vehicle having a wheel and a fluid pressure operated brake controlling said wheel, an adaptive braking system for controlling actuation of said brake comprising:

means for generating a first control signal proportional to the rotational velocity of said wheel;

means for differentiating said first control signal to generate a second control signal proportional to acceleration and deceleration of said wheel;

means for generating a first reference signal corresponding to a first predetermined value of said second signal and a second reference signal corresponding to a second predetermined value of said second signal;

means for comparing said second control signal with said first reference signal and generating a third control signal when the value of said second control signal drops below the value of said first reference signal and terminating said third control signal when the value of said second control signal increases above the value of said second reference signal from a value less than said second reference signal;

means responsive to said first control signal for generating a fourth control signal decaying at a predetermined rate representing an assumed rate of decrease of vehicle velocity;

means for generating a third reference signal corresponding to a first predetermined value of said fourth control signal;

means for comparing said fourth control signal to said third reference signal and generating a fifth control signal when the value of said fourth control signal is less than the value of said third reference signal;

said fifth control signal inhibiting said third control signal; and means responsive to said third control signal for effecting a reduction of the fluid pressure level actuating said brake;

said means for generating said fourth control signal including energy storage means, the energy stored in said energy storage means increasing as the value of said first control signal increases, means preventing decrease of the energy stored by said energy storage means as the value of said first control signal decreases at a rate greater than the predetermined rate, and means for decreasing the energy stored by said energy storage means at said predetermined rate when the value of said first signal decreases faster than said predetermined rate.

10. In a vehicle having a wheel and a fluid pressure operated brake controlling said wheel, an adaptive braking system for controlling actuation of said brake comprising:

means for generating a first control signal proportional to the rotational velocity of said wheel;

means for differentiating said first control signal to generate a second control signal proportional to acceleration and deceleration of said wheel;

means for generating a first reference signal corresponding to a first predetermined value of said second signal and a second reference signal corresponding to a second predetermined value of said second signal;

means for comparing said second control signal with said first reference signal and generating a third control signal when the value of said second control signal drops below the value of said first reference signal and terminating said third control signal when the value of said second control signal increases above the value of said second reference signal from a value less than said second reference signal;

means responsive to said first control signal for generating a fourth control signal decaying at a predetermined rate representing an assumed rate of decrease of vehicle velocity;

means for generating a third reference signal corresponding to a first predetermined value of said fourth control signal;

means for comparing said fourth control signal to said third reference signal and generating a fifth control signal when the value of said fourth control signal is less than the value of said third reference signal;

said fifth control signal inhibiting said third control signal; and means responsive to said third control signal for effecting a reduction of the fluid pressure level actuating said brake;

said means for generating said fourth control signal including means for generating a signal decaying at a predetermined rate only when said first control signal decreases at a more rapid rate than said predetermined rate, said means for generating said fourth signal including further means for generating a signal proportioned to said first control signal at all times when the latter increases or decreases at a rate less than said predetermined rate, when the value of said first control signal is greater than the value of the signal decreasing at said predetermined rate.

11. The invention of claim 10; and timing means responsive to initial generation of said fifth control signal for inhibiting said fifth control signal until said fifth control signal has been generated for a predetermined time period.

* * * * *